United States Patent
Kaupert et al.

(10) Patent No.: US 9,987,590 B2
(45) Date of Patent: Jun. 5, 2018

(54) DEVICE FOR DETACHABLE FASTENING OF A DRYING AGENT CARTRIDGE TO A HOUSING SECTION OF A COMPRESSED-AIR TREATMENT INSTALLATION OF A VEHICLE

(71) Applicant: MAN Truck & Bus AG, München (DE)

(72) Inventors: Oliver Kaupert, München (DE); Wolfgang Kolland, München (DE); Georg Haslberger, Reichertsheim (DE); Thomas Hofstetter, Mainburg (DE)

(73) Assignee: MAN Truck & Bus AG, München (DE)

(*) Notice: Subject to any disclaimer, the term of this patent is extended or adjusted under 35 U.S.C. 154(b) by 98 days.

(21) Appl. No.: 15/294,141

(22) Filed: Oct. 14, 2016

(65) Prior Publication Data
US 2017/0106335 A1    Apr. 20, 2017

(30) Foreign Application Priority Data
Oct. 16, 2015 (DE) ........................ 10 2015 013 491

(51) Int. Cl.
*B01D 53/02* (2006.01)
*B01D 53/26* (2006.01)
(Continued)

(52) U.S. Cl.
CPC ....... *B01D 53/261* (2013.01); *B01D 53/0415* (2013.01); *B60T 17/002* (2013.01);
(Continued)

(58) Field of Classification Search
CPC ........ B01D 2257/80; B01D 2259/4566; B01D 53/0415; B01D 53/261; B60T 17/002; B60T 17/004
See application file for complete search history.

(56) References Cited

U.S. PATENT DOCUMENTS

| 3,695,437 A | 10/1972 | Shaltis |
| 2002/0189458 A1 | 12/2002 | Fornof et al. |

(Continued)

FOREIGN PATENT DOCUMENTS

| DE | 102007034435 A1 | 1/2009 |
| DE | 102010010882 A1 | 9/2011 |

(Continued)

OTHER PUBLICATIONS

European Search Report issued in corresponding application No. 16002073.1 dated Apr. 12, 2017.

*Primary Examiner* — Christopher P Jones
(74) *Attorney, Agent, or Firm* — Carter, DeLuca, Farrell & Schmidt, LLP

(57) ABSTRACT

A device is provided for detachably fastening a drying agent cartridge to a housing section of a compressed-air treatment installation of a vehicle. The drying agent cartridge has a cartridge housing with a cover and a carrier element, which, in an installed position, is detachably fastened to the housing section. The device includes a thread arranged on the carrier element, and a counterpart thread arranged on the housing section, and a sealing element arranged between the carrier element and the housing section. The sealing element is arranged in a seal groove of the housing section and fluidically connects the seal groove to a pressurizable housing chamber of the compressed-air treatment installation, can be acted on with a system pressure of the compressed-air treatment installation in order to generate and/or increase the (Continued)

axial compression of the sealing element between the carrier element and the housing section.

15 Claims, 3 Drawing Sheets

(51) Int. Cl.
    *B01D 53/04*     (2006.01)
    *B60T 17/00*     (2006.01)

(52) U.S. Cl.
    CPC ........ *B60T 17/004* (2013.01); *B01D 2257/80* (2013.01); *B01D 2259/4566* (2013.01)

(56) References Cited

U.S. PATENT DOCUMENTS

| | | | |
|---|---|---|---|
| 2003/0110949 A1 | 6/2003 | Fornof et al. | |
| 2008/0110340 A1* | 5/2008 | Hoffman | B01D 53/0415 95/118 |
| 2009/0199522 A1* | 8/2009 | Hilberer | B60T 17/004 55/385.1 |
| 2010/0236653 A1* | 9/2010 | Hilberer | B60T 17/004 137/870 |
| 2013/0036912 A1 | 2/2013 | Clair et al. | |
| 2013/0206003 A1 | 8/2013 | Hilberer | |
| 2014/0260995 A1* | 9/2014 | Adams | B01D 46/0039 96/400 |
| 2016/0375396 A1* | 12/2016 | Minato | B01D 53/0407 96/132 |

FOREIGN PATENT DOCUMENTS

| | | |
|---|---|---|
| DE | 102012105137 A1 | 12/2013 |
| DE | 102013103066 A1 | 10/2014 |
| EP | 2581131 A1 | 4/2013 |
| GB | 2103954 A | 3/1983 |
| WO | 2007/056589 A2 | 5/2007 |

* cited by examiner

DEVICE FOR DETACHABLE FASTENING OF A DRYING AGENT CARTRIDGE TO A HOUSING SECTION OF A COMPRESSED-AIR TREATMENT INSTALLATION OF A VEHICLE

TECHNICAL FIELD

The present disclosure relates to a device for the detachable fastening of a drying agent cartridge to a housing section of a compressed-air treatment installation of a vehicle, in particular of a utility vehicle.

BACKGROUND

Compressed-air systems, in particular in utility vehicles, require a so-called air treatment installation downstream of the air compressor. In such treatment installations, the air is, inter alia, dried and filtered, and oil constituents are separated out. These processes all take place in a so-called drying agent cartridge which, broadly speaking, is composed of a base panel with openings for the throughflow of the air and of a cup-shaped or pot-shaped cover, which base panel and cover are fixedly connected to one another. In said drying agent cartridge there is situated a moisture-adsorbing granulate which extracts the moisture from the air flowing through. When used in a utility vehicle, said granulate has only a limited service life. A reason for this is that the oil mist contained in the compressed air is deposited on the granulate and thus reduces the effective surface area for the absorption of moisture. Furthermore, the granulate can mechanically break down as a result of the vibration loading. The drying agent cartridge must therefore be exchanged at regular intervals.

For this purpose, the cartridge is typically equipped with a female thread in the base panel. It is thus possible for the used cartridge to be unscrewed from, and for a new cartridge to be screwed onto, an external thread on the housing of the compressed-air treatment installation, for example on the air dryer housing. Use is normally made of a square-section sealing ring which is compressed axially as a result of the screwing-on process, thus imparts a sealing action, and at the same time ensures the axial bracing action of the screw connection. Drying agent cartridges of said type are known for example from the laid-open specifications DE 10 2013 103 066 A1, DE 10 2012 105 137 A1 and DE 10 2007 034 435 A1.

Depending on the installation location of the compressed-air treatment installation, the accessibility to the cartridge for an exchange is often restricted. The cartridge is always fastened to the top of the housing of the compressed-air treatment installation, and therefore the optimum direction of access for the exchange of the cartridge would be from above. This freedom however does not always exist owing to body structures in the case of heavy goods vehicles or generally in the case of buses. Furthermore, work is often performed from below if the vehicle is standing over the workshop pit.

Nowadays, in some cases very firmly seated cartridges exist, in the case of which the predefined service times for the cartridge exchange in the workshop cannot be adhered to. A very high release moment is required, which, despite auxiliary means such as for example a clamping strap with a long lever, is difficult to apply because the lateral free space for the use of a lever does not exist.

In the case of the fastenings between cartridge base panel and housing of the compressed-air treatment unit such as are known from practice, because the sealing element, typically a square-section sealing ring, must co-rotate during the screwing-on process, large fluctuations arise in the tightening moment owing to different friction influences, and damage to or twisting of the sealing element occurs, which in turn results in leakage. Furthermore, the axial bracing action of the screw connection must be generated by way of the seal.

SUMMARY

It is therefore an object of the present disclosure to provide an improved means for being able to detachably fasten a drying agent cartridge to a housing of an air treatment installation, by which means disadvantages of conventional techniques can be avoided. In particular, it is the object of the present disclosure to provide a fastening interface for a drying agent cartridge, by way of which fastening interface the cartridge can be fastened in sealed-off fashion to a housing of the air treatment installation, for example of the air dryer, and can be safely and reliably released again with constant expenditure of force.

Said objects are achieved by way of a device having the features of the independent claim. Advantageous embodiments and uses of the present disclosure will emerge from the dependent claims and will be discussed in more detail in the following description, with partial reference to the figures.

According to general aspects of the present disclosure, a device for the detachable fastening of a drying agent cartridge to a housing section of a compressed-air treatment installation or air drying installation of a vehicle is provided. The device provides an interface for the detachable fastening of the drying agent cartridge to the housing section. The expression "housing section" refers to that part of the compressed-air treatment installation to which the drying agent cartridge is detachably fastened. The housing section may for example be a housing of the air dryer. The compressed-air treatment installation may be provided for a compressed-air brake installation of a vehicle. The vehicle may be a utility vehicle.

The drying agent cartridge, also referred to as drying cartridge, comprises, in a manner known per se, a cartridge housing in which there is held a drying agent container. The cartridge housing has a cover, which delimits the cartridge housing in an upward direction and which is typically of cup-shaped or pot-shaped form, and a carrier element which delimits the cartridge housing in a downward direction. In the installed position, the carrier element is detachably fastened to the housing section of the compressed-air treatment installation and is also referred to as base panel.

In correlation with the prior art, the device according to the present disclosure has a thread arranged on the carrier element, and has a counterpart thread, for example in the form of an external thread, arranged on the housing section, for the screw connection of the drying agent cartridge to the housing section. In order to seal off the cartridge with respect to the housing section of the air treatment installation in the installed state, it is furthermore the case that a sealing element, preferably a moulded seal, is arranged between the carrier element and the housing section, which sealing element is compressed and/or compressible in order to seal off the carrier element on the housing section with respect to said housing section. For the sealing action, the sealing element is compressed primarily axially. The axial direction corresponds to the direction of the screw connection axis, or of the central axis, which is perpendicular to the carrier element, of the drying agent cartridge.

According to general aspects of the present disclosure, the sealing element is arranged in a seal groove of the housing section and, via a fluidic connection which fluidically connects the seal groove to a pressurizable housing chamber of the compressed-air treatment installation, can be acted on with a system pressure of the compressed-air treatment installation in order to generate and/or increase the axial compression of the sealing element between the carrier element and the housing section.

This offers the advantage that the actual sealing action owing to the axial compression of the sealing element is generated not, or at least not only, by way of the screw connection but primarily by way of the exertion of pressure on the sealing element. In other words, in the screwed-on but unpressurized state, the sealing element is acted on with either no axial force or with only a first axial force which is lower than the final axial force generated as a result of the action of the system pressure on the sealing element via the fluidic connection. For this purpose, the sealing element is preferably arranged between the housing section and the drying agent cartridge such that, during the screwing-on of the carrier element onto the housing section, said sealing element is not twisted or is twisted only slightly, and/or such that, when the drying agent cartridge is in the screwed-on state on the housing section, in the unpressurized state, a basic sealing action is realized and, upon the action of pressure on the sealing element, a second sealing action is generated which is more intense than the basic sealing action.

Here, the seal groove is preferably in the form of a seal groove which is recessed in the housing section, more preferably in the form of an encircling ring-shaped groove around the central axis of the drying agent cartridge.

In a particular embodiment, the device comprises an abutment on the cartridge housing, which abutment, during the screwing-on of the cartridge housing, can be screwed on as far as a point of abutment against the housing section of the compressed-air treatment installation, preferably without an additional axial force, resulting for example from the axially compressed sealing element, being generated. The abutment may be provided as at least one abutment surface. The abutment thus defines a predetermined spacing of the seal groove to the abutment surface of the housing of the air treatment installation, and thus the axial force that acts on the sealing element in a state in which the cartridge has been screwed as far as a point of abutment and has not yet been charged with system pressure. Thus, in this state, the axial force acting on the sealing element is independent of the tightening torque of the screw connection.

In this embodiment, the device furthermore comprises a planar surface of the carrier element, also referred to below as planar sealing surface, which, during the screwing-on as far as a point of abutment, assumes a predetermined spacing to the housing section and projects beyond the sealing element. The device is preferably designed such that the planar surface, in the state in which screwing-on has been performed as far as a point of abutment and in the unpressurized state of the device (that is to say a state in which the sealing element is not acted on with the system pressure of the air treatment installation), does not make contact with the sealing element, in order to prevent the sealing element from co-rotating and/or being twisted during the screwing-on process. It is however the case that the planar sealing surface bears against the sealing element at least when the sealing element is acted on with system pressure, because the sealing element is then pressed against the planar sealing surface, and axially compressed, by the acting pressure in order to seal off the abutment region. It is however emphasized that the device may also be designed such that the planar sealing surface, in the state in which screwing-on has been performed as far as a point of abutment and in the unpressurized state of the device, may also bear against the sealing element, if the sealing element is thereby subjected to only slight axial compression and/or only slight twisting.

The planar sealing surface may furthermore form a gap, in particular a ring-shaped gap, for example a radial ring-shaped gap, relative to the housing section, because, owing to the abutment, the planar sealing surface is always spaced apart from the opposite housing section of the compressed-air treatment installation.

The abutment or the abutment surface ensures that the drying agent cartridge can be screwed firmly against a hard abutment and, here, very constant tightening moments and correspondingly constant release moments during cartridge exchange are realized. The abutment furthermore ensures that, during the screwing-on of the drying agent cartridge to the housing section, the sealing element does not co-rotate, that is to say is at most axially compressed slightly, but is not twisted, or is at least twisted only slightly.

The abutment is preferably a metallic, hard abutment and may be formed as a component of the drying agent cartridge, for example as a section of the carrier element, in particular of the base plate. The abutment may be arranged radially to the inside or radially to the outside of the seal groove or to both sides of the seal groove. The radial direction is perpendicular to the abovementioned axial direction.

In a further particular exemplary embodiment, the sealing element has a cross-sectional profile which generates a self-boosting sealing action and/or a self-reinforcing geometry under pressure. For example, the sealing element may have, in the region of its abutment surface against the base region of the seal groove, protruding beads and a depression between the beads, which depression is arranged above an end region, which opens into the seal groove, of the fluidic connection. In an advantageous variant of this embodiment, the seal groove is a ring-shaped groove, and the sealing element is a sealing ring having protruding beads in the region of its abutment surface against the lower lateral regions of the ring-shaped groove and having a depression formed by the beads between the beads, which depression is arranged above an end region of the fluidic connection. In the state in which it is braced in the ring-shaped groove, the sealing ring is, when acted on with pressure, deformed such that the beads are pressed with even greater intensity laterally upward against the edge surfaces of the ring-shaped groove. A self-boosting effect is thus achieved.

It is also advantageous if, in the non-installed state of the drying agent cartridge, the sealing element projects out of an edge region, facing toward the carrier element, of the seal groove, such that, even in the unpressurized state, a basic sealing action is realized as a result of the abutment of the sealing surface against the projecting-out region.

The fluidic connection may comprise a first fluidic connection which opens into a base region of the seal groove and connects said seal groove to the pressurizable housing chamber. Said first fluidic connection may be provided in the form of a duct, more preferably in the form of a connecting bore, for example in the form of a transverse or oblique bore. It is however particularly advantageous if the first fluidic connection runs in downwardly sloping fashion from the seal groove into the housing chamber, such that the oil-water residue that arises during operation can automatically flow out. It is also advantageous if the first fluidic connection opens into an encircling depression, in particular into a ring-shaped duct, which is provided on the base of the seal groove. In this way, the pressure is distributed more effectively under the sealing element.

Said encircling depression may for example be formed indirectly during the casting of the housing, whereas the seal groove as a whole is produced selectively during the casting or for the first time during the subsequent cutting process, or by way of both processes.

In the context of the present disclosure, it is furthermore possible for the fluidic connection to comprise a second fluidic connection which comprises the gap and which fluidically connects the latter to the pressurizable housing chamber. In this way, the sealing element can be acted on with pressure not only from below via the first fluidic connection but also laterally via the second fluidic connection, in order thereby to intensify the sealing action that can be achieved.

Furthermore, a groove or notch may be provided which permits pressure equalization between the surrounding atmosphere and a section, situated between the abutment surface and the sealing element, of the gap. Here, the groove or notch may be provided selectively in the carrier element of the drying agent cartridge or in the housing section.

The carrier element may, in a manner known per se, have a carrier panel and a crimped plate, wherein the fastening between carrier panel and cover is realized by way of the crimped plate. The carrier panel has an inflow opening and, within the thread, a central outflow opening, wherein the thread may be in the form of a female thread in order for the carrier element to be screwed onto a counterpart thread, for example an external thread, of a housing of the compressed-air treatment installation. The carrier element or the carrier panel may, for example for fastening to the housing section, for example to the dryer housing, be detachably held on an external thread, which extends axially centrally through the drying agent cartridge, of the housing section.

In one design variant, the crimped plate has, on an underside of the carrier panel, a planar first face surface, which forms the above-described planar surface of the carrier element, and a planar second face surface, which has a greater spacing from the carrier panel than the first face surface, wherein the second face surface forms the abutment surface.

The present disclosure also relates to a compressed-air treatment installation for a vehicle, in particular for a utility vehicle, comprising a drying agent cartridge which is detachably connectable to a housing section of the compressed-air treatment installation, having a drying agent cartridge housing with a cover, which delimits the drying agent cartridge housing in an upward direction, and with a carrier element which delimits the drying agent cartridge housing in a downward direction. Here, the housing section and the drying agent cartridge are connected to one another by way of a device as described in this document. The present disclosure also relates to a utility vehicle having a device of said type and/or having a compressed-air treatment installation of said type.

BRIEF DESCRIPTION OF THE DRAWINGS

The above-described embodiments and features of the present disclosure may be combined with one another in any desired manner. Further details and advantages of the present disclosure will be described below with reference to the appended drawings. In the drawings.

DETAILED DESCRIPTION OF THE DRAWINGS

Figure 1:
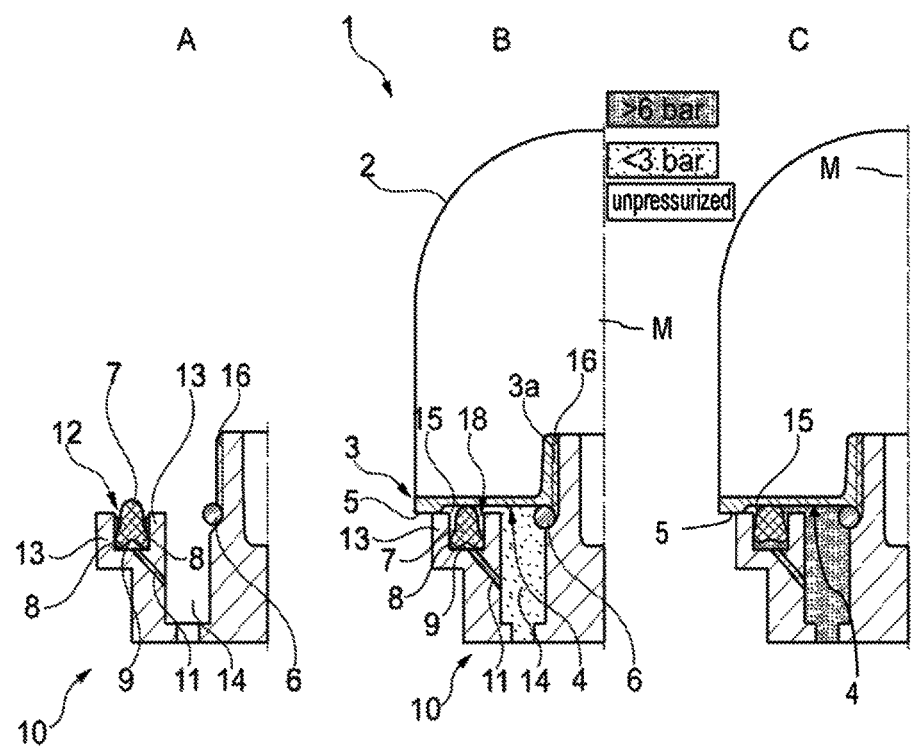
FIG. 1 shows three illustrations of a device for the detachable fastening of a drying agent cartridge to a housing section of an air treatment installation, according to an exemplary embodiment of the present disclosure.

FIG. 1 shows three illustrations of a fastening interface for the detachable fastening of a drying agent cartridge to a housing section of an air treatment installation, according to an exemplary embodiment of the present disclosure. Here, in the sub-figure A, FIG. 1 shows a sectional view of a housing section 10 of an air dryer of a compressed-air treatment installation of a utility vehicle. The sub-figures B and C each show the housing section 10 from subfigure A with a drying agent cartridge screwed thereon, wherein only the cartridge housing is illustrated, without the internal construction of the cartridge, which may be designed in the conventional manner, being illustrated.

Here, the sub-figure B shows a state of the device in the presence of a system pressure of below 3 bar, and the sub-figure C shows a state of the device in the presence of a system pressure of over 6 bar. To simplify the illustrations, the sub-figures A to C show in each case only one of the symmetrical halves of the device. That part (not illustrated) of the device for the fastening of the drying agent cartridge to the housing section which is situated in each case to the right of the central axis M which defines the axial direction is thus structurally identical to the illustrated half.

The cartridge housing of the drying agent cartridge has a pot-shaped or cup-shaped cover 2 (cartridge housing cover), which delimits the cartridge housing in an upward direction, and a carrier element 3, for example in the form of a base panel, which delimits the cartridge housing in a downward direction. In an installed position, illustrated in the sub-figures B and C, on a housing section 10 of the air dryer of the compressed-air treatment installation 1, the carrier element 3 is detachably held by way of a thread 3a, which in the present case is in the form of a female thread, on a counterpart thread, which is in particular an external thread 16 and which extends axially centrally through the drying agent cartridge, of the housing section 10. Within the thread 3a, the carrier element 3 has a central outflow opening, via which the dried and purified air exits the drying agent cartridge.

An encircling sealing element, which in the present case is in the form of a moulded seal 7 and which serves for sealing off the drying agent cartridge with respect to the housing section 10, is arranged in a ring-shaped groove 12 which is recessed in the housing section 10 and the limbs of which are denoted by 13. In the non-installed state of the drying agent cartridge, the moulded seal 7 projects out of an edge region, facing toward the carrier element 3, of the seal groove 12, as can be seen in the sub-figure A. The base region of the seal groove 12 is fluidically connected by way of a downwardly sloping connecting bore 11 to a pressurizable housing chamber 14 of the compressed-air treatment installation 1. In this way, during operation of the compressed-air treatment installation 1, the moulded seal can be acted on with the system air pressure of the compressed-air treatment installation via the connecting bore 11.

The underside of the carrier element has an abutment surface 5 which, during the screwing-on of the cartridge housing, can be screwed on as far as a point of abutment against the housing section 10 of the compressed-air treatment installation 1, and thus, in the state in which it has been screwed on, defines a defined spacing of the carrier element 3 to the housing section. The abutment surface 5 is adjoined, radially to the inside, by a planar sealing surface 4 which, owing to the abutment surface, during the screwing-on of the cartridge housing as far as a point of abutment, has a predetermined spacing to the housing section and, here, covers the moulded seal. The sealing surface 4 is arranged relative to the abutment 5 in the axial direction M such that, in the state in which screwing-on has been performed as far as a point of abutment and in the unpressurized state of the device (that is to say a state in which the moulded seal 7 is not acted on with the system pressure of the air treatment installation), the sealing surface 4 does not quite make contact with the moulded seal 7. In this way, the moulded seal 7 is prevented from co-rotating and/or being twisted during the screwing-on process. Instead, the abutment 5 substantially defines the tightening moment and release moment of the screw connection.

However, at least when the moulded seal is acted on with system pressure, in this case a pressure of greater than 6 bar, as illustrated in sub-figure C, the planar sealing surface 4 bears against the moulded seal, because the moulded seal 7 is then axially compressed against the planar sealing surface 4 by the acting pressure.

In the state in which screwing-on has been performed as far as a point of abutment, a radial ring-shaped gap 18 forms owing to the abutment 5 between the planar sealing surface 4 and the opposite housing section, which in the present exemplary embodiment is delimited radially at the outside by the abutment 5 and radially at the inside by an O-ring 6. That region 15 of the ring-shaped gap 18 which is situated between the moulded seal 6 and the abutment 5 has a notch or a further groove (not illustrated) which permits pressure equalization between the surrounding atmosphere and the region 15. The region 15 is thus always unpressurized, that is to say at atmospheric pressure. By contrast, that region of the ring-shaped gap 18 which is situated radially to the inside of the moulded seal 7 is likewise fluidically connected to the housing chamber 14 (second fluidic connection), such that, under the action of pressure, the moulded seal 7 is additionally radially compressed by air pressure transmitted via the ring-shaped gap 18.

The moulded seal 7 has a cross-sectional profile which generates a self-boosting sealing action and/or a self-reinforcing geometry under pressure. In the present case, the moulded seal 7 which is situated in the ring-shaped groove 12 and which is in the form of a sealing ring has, in the region of its abutment surface against the lower lateral regions of the ring-shaped groove 12, two protruding beads 8, and a depression 9 formed by said beads 8 between the beads 8. The depression 9 is situated over an end region of the connecting bore 11. In the state in which it is braced in the ring-shaped groove 12, the sealing ring is, when acted on with pressure, deformed such that the beads 8 are pressed with even greater intensity laterally upward against the edge surfaces of the limbs 13 of the ring-shaped groove 12. A self-boosting effect is thus achieved.

Sub-figure C shows the state of the device when acted on with system pressure. The lower beads 8 of the moulded seal 7 are pressed upward and laterally outward, and the top side of the moulded seal is pressed axially against the planar sealing surface 4. Furthermore, the moulded seal 7 is deformed in the upper region situated radially at the inside owing to the additional lateral exertion of pressure via the right-hand region of the ring-shaped gap 18. The actual sealing action is thus established for the first time as a result of the exertion of pressure on the moulded seal 7, and not during the screwing-on process in the unpressurized state.

In summary, with the proposed fastening interface, the sealing element (moulded seal 7) is, during the tightening process, at best axially compressed but not twisted, or at least only slightly twisted. The actual sealing action is realized for the first time as a result of the exertion of pressure. Furthermore, the cartridge can be firmly screwed against a hard abutment, which makes it possible to realize constant tightening moments and correspondingly also constant release moments during a cartridge exchange. It is thus possible to ensure greater reliability during operation and greater ease of maintenance during a cartridge exchange, because the sealing element (presently typically a square-section sealing ring) does not need to co-rotate during the screwing-on process. Fluctuations in the tightening moment as a result of different friction influences are avoided. Damage to or twisting of the sealing element can likewise be avoided or at least significantly reduced, because said sealing element is fixed with respect to the housing and is not fully compressed for as long as no pressure acts.

Figure 2:
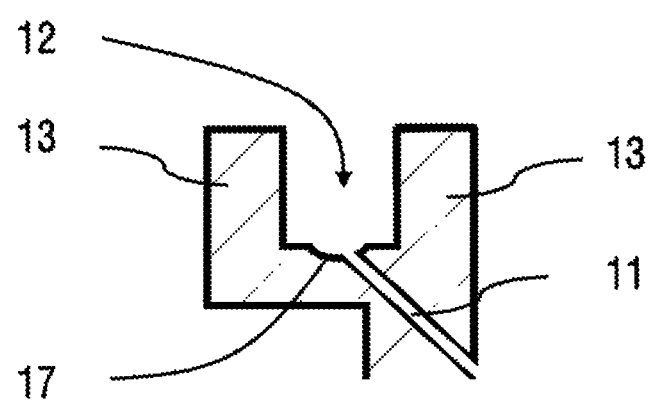
FIG. 2 shows a seal groove according to an exemplary embodiment of the present disclosure.

FIG. 2 shows a further design variant of the seal groove. Identical or functionally equivalent elements in relation to FIG. 1 are denoted by the same reference designations. The special feature of this variant is the encircling depression 17 in the form of a ring-shaped duct, into which the connecting bore 11 opens and which is provided on the base of the seal groove 12 which is in the form of a ring-shaped groove. In this way, the air pressure is distributed more effectively under the sealing element 7, and an improved axial bracing action is made possible.

Figure 3:
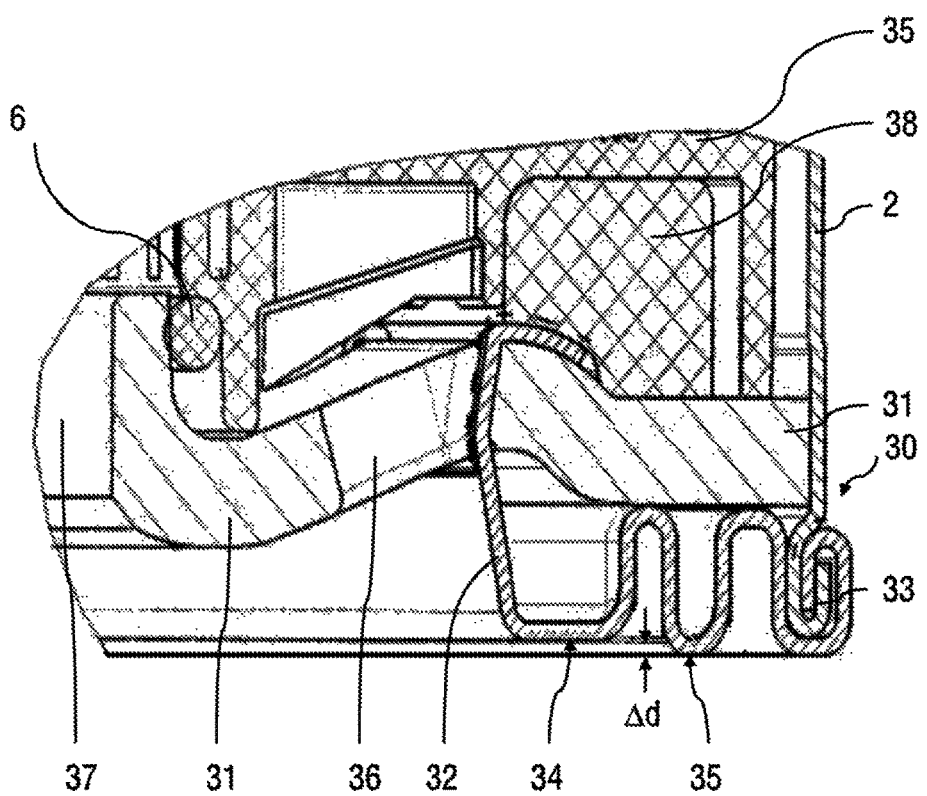
FIG. 3 shows a device for the detachable fastening of a drying agent cartridge to a housing section of an air treatment installation, according to a further exemplary embodiment of the present disclosure.

FIG. 3 shows a device for the detachable fastening of a drying agent cartridge 20 to a housing section of an air treatment installation, according to a further exemplary embodiment of the present disclosure. FIG. 3 shows an enlarged detail of a radially outer, lower region of the drying agent cartridge 20. The internal construction of the drying agent cartridge 20 may be of a design known per se, for example as described in the laid-open specifications DE 10 2013 103 066 A1, DE 10 2012 105 137 A1 and DE 10 2007 034 435 A1. The reference designation 38 denotes the oil filter 38, which is formed by a nonwoven, and the reference designation 35 denotes a part of the internal container for the drying agent. As described in the laid-open specifications DE 10 2013 103 066 A1, DE 10 2012 105 137 A1 and DE 10 2007 034 435 A1, the carrier element is likewise formed from a carrier panel 31 and a crimped plate 32, wherein the fastening between carrier panel 31 and the pot-shaped cartridge housing cover 2 of the drying agent cartridge is realized by way of the crimped plate 32 by virtue of the cartridge housing cover 2 and crimped plate 32 being crimped together in order to form the cartridge seam 33. FIG. 3 also shows the air inflow opening 36 in the carrier panel 31 and the central air outflow opening 37.

The special feature of this design variant lies in the fact that the crimped plate 32 has, on an underside at an underside of the carrier panel 31, a planar first face surface 34 on a crimped formation, which planar first face surface forms the planar sealing surface of the carrier element. It is also the case that the crimped plate 32 has, on an underside of a further crimped formation, a planar second face surface 35 which has a greater spacing from the carrier panel 31 than the first face surface and which forms the abutment surface for the screwing-on process. In other words, the surface 35 corresponds to the abutment surface 5 of FIG. 1, and the surface 34 corresponds to the sealing surface 4 of FIG. 1. The projecting length, denoted by Δd, corresponds to the spacing of the surface 34 from the housing section 10 of the air treatment installation (not illustrated in FIG. 3) in the state in which screwing-on has been performed as far as a point of abutment.

Even though the present disclosure has been described with reference to particular exemplary embodiments, it is evident to a person skilled in the art that various changes may be made, and equivalents used as replacements, without departing from the scope of the present disclosure. Furthermore, numerous modifications may be made without departing from the associated scope. Consequently, the present disclosure is not intended to be restricted to the disclosed exemplary embodiments, but is rather intended to encompass all exemplary embodiments which fall within the scope of the appended patent claims. In particular, the present disclosure also claims protection for the subject matter and the features of the sub-claims independently of the claims referred to.

The invention claimed is:

1. A device for the detachable fastening of a drying agent cartridge to a housing section of a compressed-air treatment installation of a vehicle, wherein the drying agent cartridge has a cartridge housing with a cover, which delimits the cartridge housing in an upward direction, and a carrier element which delimits the cartridge housing in a downward direction and which, in an installed position, is detachably fastened to the housing section of the compressed-air treatment installation, the device comprising:
   a thread, which is arranged on the carrier element;
   a counterpart thread, which is arranged on the housing section, for the screw connection of the drying agent cartridge to the housing section; and
   a sealing element, which is arranged between the carrier element and the housing section, for sealing off the carrier element on the housing section with respect to said housing section,
   wherein the sealing element is arranged in a seal groove of the housing section and, via a fluidic connection which fluidically connects the seal groove to a pressurizable housing chamber of the compressed-air treatment installation, can be acted on with a system pressure of the compressed-air treatment installation in order to generate and/or increase the axial compression of the sealing element between the carrier element and the housing section.

2. The device according to claim 1, wherein
   (a) an abutment on the cartridge housing, which abutment, during the screwing-on of the cartridge housing, can be screwed on as far as a point of abutment against the housing section of the compressed-air treatment installation, and, in the state in which screwing-on has been performed as far as a point of abutment, defines a predetermined axial end position of the seal groove relative to the housing section, and
   (b) a planar sealing surface of the carrier element, which sealing surface, during the screwing-on of the cartridge housing as far as a point of abutment, assumes a predetermined spacing to the housing section and bears against the sealing element at least in the event of action of system pressure on the sealing element and preferably forms a gap, in particular a ring-shaped gap, relative to the housing section.

3. The device according to claim 1, wherein the sealing element has a cross-sectional profile, which generates a self-boosting sealing action and/or a self-reinforcing geometry under pressure.

4. The device according to claim 1, wherein the sealing element has, in the region of its abutment surface against the base region of the seal groove, protruding beads and a depression between the beads, which depression is arranged above an end region, which opens into the seal groove, of the fluidic connection.

5. The device according to claim 1, wherein, in the non-installed state of the drying agent cartridge, the sealing element projects out of an edge region, facing toward the carrier element, of the seal groove.

6. The device according to claim 1, wherein the fluidic connection comprises a first fluidic connection, which opens into a base region of the seal groove and connects the seal groove to the pressurizable housing chamber.

7. The device according to claim 6, wherein the first fluidic connection is provided in the form of a duct.

8. The device according to claim 6, wherein the first fluidic connection runs in downwardly sloping fashion from the seal groove into the housing chamber.

9. The device according to claim 6, wherein the first fluidic connection opens into an encircling depression, which is provided in the base of the seal groove.

10. The device according to claim 6, wherein the first fluid connection opens into an en-circling ring-shaped duct, which is provided in the base of the seal groove formed as a ring-shaped groove.

11. The device according to claim 2, wherein the fluidic connection comprises a second fluidic connection, which comprises the gap and which fluidically connects the gap to the pressurizable housing chamber.

12. The device according to claim 2, further comprising a groove or notch, which permits pressure equalization between the surrounding atmosphere and a section, situated between the abutment and the sealing element, of the gap.

13. The device according to claim 1, wherein the carrier element has a carrier panel and a crimped plate, wherein the fastening between the carrier panel and the cover is realized by way of the crimped plate.

14. The device according to claim 13, wherein the crimped plate, on an underside of the carrier panel,
   (a) has a planar first face surface which forms the planar surface of the carrier element; and
   (b) has a planar second face surface which has a greater spacing from the carrier panel than the first face surface and which forms the abutment surface.

15. A compressed-air treatment installation for a vehicle, comprising:
   a housing section;
   a drying agent cartridge which is detachably connectable to the housing section of the compressed-air treatment installation, having a drying agent cartridge housing with a cover, which delimits the drying agent cartridge housing in an upward direction, and with a carrier element which delimits the drying agent cartridge housing in a downward direction; and
   a device connecting the housing section and the drying agent cartridge to one another, the device comprising:
   a thread, which is arranged on the carrier element, a counterpart thread, which is arranged on the housing section, for a screw connection of the drying agent cartridge to the housing section, and a sealing element, which is arranged between the carrier element and the housing section, for sealing off the carrier element on the housing section with respect to said housing section, wherein the sealing element is arranged in a seal groove of the housing section and, via a fluidic connection which fluidically connects the seal groove to a pressurizable housing chamber of the compressed-air treatment installation, can be acted on with a system pressure of the compressed-air treatment installation in order to generate and/or increase the axial compression of the sealing element between the carrier element and the housing section.

\* \* \* \* \*